United States Patent
Headley et al.

(10) Patent No.: US 9,625,221 B2
(45) Date of Patent: Apr. 18, 2017

(54) LIQUID DISTRIBUTION DEVICE UTILIZING PACKED DISTRIBUTION TROUGHS AND A MASS TRANSFER COLUMN AND PROCESS INVOLVING SAME

(71) Applicant: Koch-Glitsch, LP, Wichita, KS (US)

(72) Inventors: Darran Matthew Headley, Valley Center, KS (US); Izak Nieuwoudt, Wichita, KS (US); Stephen Andrew Pile, Bel Aire, KS (US)

(73) Assignee: Koch-Glitsch, LP, Wichita, KS (US)

( * ) Notice: Subject to any disclaimer, the term of this patent is extended or adjusted under 35 U.S.C. 154(b) by 426 days.

(21) Appl. No.: 14/155,746

(22) Filed: Jan. 15, 2014

(65) Prior Publication Data

US 2014/0216690 A1 Aug. 7, 2014

Related U.S. Application Data

(60) Provisional application No. 61/760,495, filed on Feb. 4, 2013.

(51) Int. Cl.
*F28F 25/04* (2006.01)
*F28D 21/00* (2006.01)
*B01D 3/00* (2006.01)

(52) U.S. Cl.
CPC ............. *F28F 25/04* (2013.01); *B01D 3/008* (2013.01); *F28D 21/0015* (2013.01)

(58) Field of Classification Search
CPC ....... F28D 21/0015; F28F 25/04; B01D 3/008
(Continued)

(56) References Cited

U.S. PATENT DOCUMENTS 4,846,266 A * 7/1989 Acker .................... F28F 25/04
165/115
5,061,407 A * 10/1991 Nutter ................... B01D 53/185
261/96
(Continued)

FOREIGN PATENT DOCUMENTS

SU 1125029 A 11/1984
WO 2005058746 A2 6/2005

OTHER PUBLICATIONS

International Search Report and Written Opinion for PCT/US2014/012395, dated Apr. 12, 2014, 8 pages.
(Continued)

*Primary Examiner* — Charles Bushey (57) ABSTRACT

A flow distributor for a liquid descending in a vertically elongated mass transfer column, a mass transfer column employing the same, and a method of treating a fluid stream in the mass transfer column is provided. The flow distributor includes a central distribution member for passing liquid to a plurality of outwardly extending side arm members, which, in turn, feed the liquid into a plurality of distribution troughs located below the elongated side members. The distribution troughs, which may be oriented substantially perpendicularly or substantially parallel to the elongated side members, include a bed of packing material disposed therein. Use of such distributors in vapor-liquid or liquid-liquid columns results in more uniform horizontal distribution of the liquid across the diameter of the column.

20 Claims, 11 Drawing Sheets

(58) Field of Classification Search
USPC .................................................. 261/97, 110
See application file for complete search history.

(56) References Cited

U.S. PATENT DOCUMENTS

| | | | | |
|---|---|---|---|---|
| 5,632,934 | A | | 5/1997 | Billingham et al. |
| 5,783,119 | A | * | 7/1998 | Ulrich .................... B01D 3/008 261/110 |
| 6,149,136 | A | | 11/2000 | Armstrong et al. |
| 6,695,008 | B2 | * | 2/2004 | Fehr ......................... B01D 1/00 137/315.01 |
| 6,722,639 | B2 | * | 4/2004 | Ender .................... B01D 3/008 261/110 |
| 6,758,463 | B2 | * | 7/2004 | Zone .................... B01D 53/185 261/110 |
| 7,060,232 | B2 | * | 6/2006 | Harter .................... B01D 3/008 422/606 |
| 7,125,004 | B2 | * | 10/2006 | Dollie .................... B01D 3/008 261/110 |
| 7,712,728 | B2 | * | 5/2010 | Kehrer ................ B01D 53/185 261/110 |
| 9,242,188 | B2 | * | 1/2016 | Franz ..................... B01D 3/008 |
| 2002/0041040 | A1 | | 4/2002 | Fischer et al. |
| 2002/0158350 | A1 | | 10/2002 | Ender et al. |
| 2005/0189663 | A1 | | 9/2005 | Dollie et al. |
| 2012/0111717 | A1 | | 5/2012 | Headley et al. |
| 2013/0328222 | A1 | | 12/2013 | Franz et al. |

OTHER PUBLICATIONS

First Office Action—Issued on May 23, 2016 in Corresponding China Application No. 201480009655.3.

* cited by examiner

LIQUID DISTRIBUTION DEVICE UTILIZING PACKED DISTRIBUTION TROUGHS AND A MASS TRANSFER COLUMN AND PROCESS INVOLVING SAME

BACKGROUND

The present invention relates generally to heat and mass transfer columns and, more particularly, to liquid flow distributors used in such columns and methods of distributing liquid using such flow distributors.

Mass transfer columns are configured to contact two fluid streams of differing characteristics with one another in order to effect mass and/or heat exchange between the different phases. The term "mass transfer column" as used herein is not intended to be limited to columns in which mass transfer is the primary objective of the processing of the fluid streams within the column, but is also intended to encompass columns in which heat transfer rather than mass transfer is the primary objective of the processing. Some mass transfer columns, such as those utilized in multicomponent distillation and absorption applications, contact a gas or vapor stream with a liquid stream, while others, such as extraction columns, may be designed to facilitate contact between two liquid phases of different densities. Oftentimes, mass transfer columns are configured to contact an ascending vapor or liquid stream with a descending liquid stream, usually along multiple mass transfer surfaces disposed within the column. Commonly, these transfer surfaces are defined within one or more regions or beds of random or structured packing material configured to facilitate intimate contact between the two fluid phases. As a result, the rate and/or degree of mass and heat transferred between the two phases in enhanced.

In order to ensure maximum contact between the two fluid phases in a mass transfer column, the descending liquid phase must be uniformly distributed as it enters a packing bed from an overlying region of the column. Uneven distribution reduces contact between the two phases and disrupts the liquid/vapor or liquid/liquid ratio along the cross-section of the column, which should be maintained substantially constant during proper operation of the column. Various types of liquid distributors have been designed with the objective of uniformly dispersing liquid across the upper surface of a packing bed, while still providing low pressure drop, minimal fouling, and a wide performance window.

Most distributors deliver liquid onto the surface of the packing at a number of spaced-apart locations, referred to as drip points. In fact, the drip point density is a measure of the distribution performance of a particular distributor. Additionally, the size of the droplets formed at the drip points is also important. If the droplets are too large, the drip points, too, may also be too large and the horizontal distribution of the liquid across the surface of the packing may be hindered. If the droplets are too small, the liquid risks being entrained in the ascending vapor or gas and carried out of the column thereby reducing the efficiency of the heat and/or mass transfer within the column.

Thus, a need exists for a liquid distributor that has the capability of providing more uniform distribution of liquid per unit of packed bed surface along a series of spaced, flow drip points. The distributor should still exhibit desirable operating characteristics, such as low pressure drop, resistance to fouling, and performance at low turn down, while being robust and flexible enough to be utilized in a wide variety of heat and mass transfer operations.

SUMMARY

In one aspect, the present invention concerns a flow distributor for liquid descending in a vertically elongated process column. The distributor comprises a central distribution member comprising at least one inlet for receiving a liquid stream and one or more liquid outlets for discharging a portion of the liquid stream from the central distribution member. The distributor comprises a plurality of elongated side members configured to receive at least a portion of the liquid stream discharged from the liquid outlets of the central distribution member. The elongated side members are longitudinally spaced from each other along the length of the central distribution member and comprise one or more openings for discharging liquid therefrom. The distributor comprises a plurality of distribution troughs positioned proximate the elongated side members. Each of the distribution troughs comprises a pair of elongated sidewalls and a substantially open floor. The elongated side walls are laterally spaced from one another to define a liquid receiving space therebetween and the liquid receiving space is configured to receive liquid discharged from the openings of the elongated side members and discharge the liquid received from the substantially open floor. At least a portion of the liquid receiving space is filled with a bed of packing material and the liquid discharged from the open floor of the distribution troughs has passed through at least a portion of the packing material.

In another aspect, the present invention concerns a mass transfer column comprising an outer column shell defining an open internal volume, a mass transfer bed positioned within the open internal volume and having an upper surface, and a liquid distributor for receiving and distributing a stream of liquid onto the upper surface of the mass transfer bed. The liquid distributor comprises at least one central distribution member, a plurality of elongated side members, and a plurality of distribution troughs. The elongated side members are located proximate the central distribution member and extend in a direction substantially perpendicular to the axis of elongation of the central distribution member. The distribution troughs are located proximate the elongated side members. Each of the distribution troughs comprises a pair of laterally-spaced elongated side walls. At least a portion of the space defined between the elongated side walls is filled with a packing material and the liquid exiting the packing material disposed within the distribution trough descends onto the upper surface of the underlying mass transfer bed after exiting the distribution troughs.

Yet another embodiment of the present invention concerns a method for treating a fluid stream in a mass transfer column. The method comprises the following steps: (a) introducing a liquid stream into a liquid flow distributor disposed within the internal volume of the mass transfer column, wherein the introducing includes passing the liquid into a first distribution member in a first direction; (b) dividing said liquid stream into two or more liquid portions; (c) introducing each of said liquid portions into a distribution trough disposed at a lower vertical elevation than said distribution member, wherein said introducing includes passing said liquid portions into said distribution troughs in a second direction; (d) passing each of said liquid portions introduced into said distribution troughs through a bed of packing material disposed within said distribution trough; (e) discharging a plurality of liquid streams from the lower portion of the distribution troughs and onto an upper surface of a mass transfer bed positioned at a lower vertical elevation than the liquid distributor; and (f) contacting at least a portion of the liquid discharged onto the upper surface of the packing bed with an upwardly ascending fluid stream to thereby effect heat and/or mass transfer between the liquid and the fluid stream.

DETAILED DESCRIPTION

Figure 1:
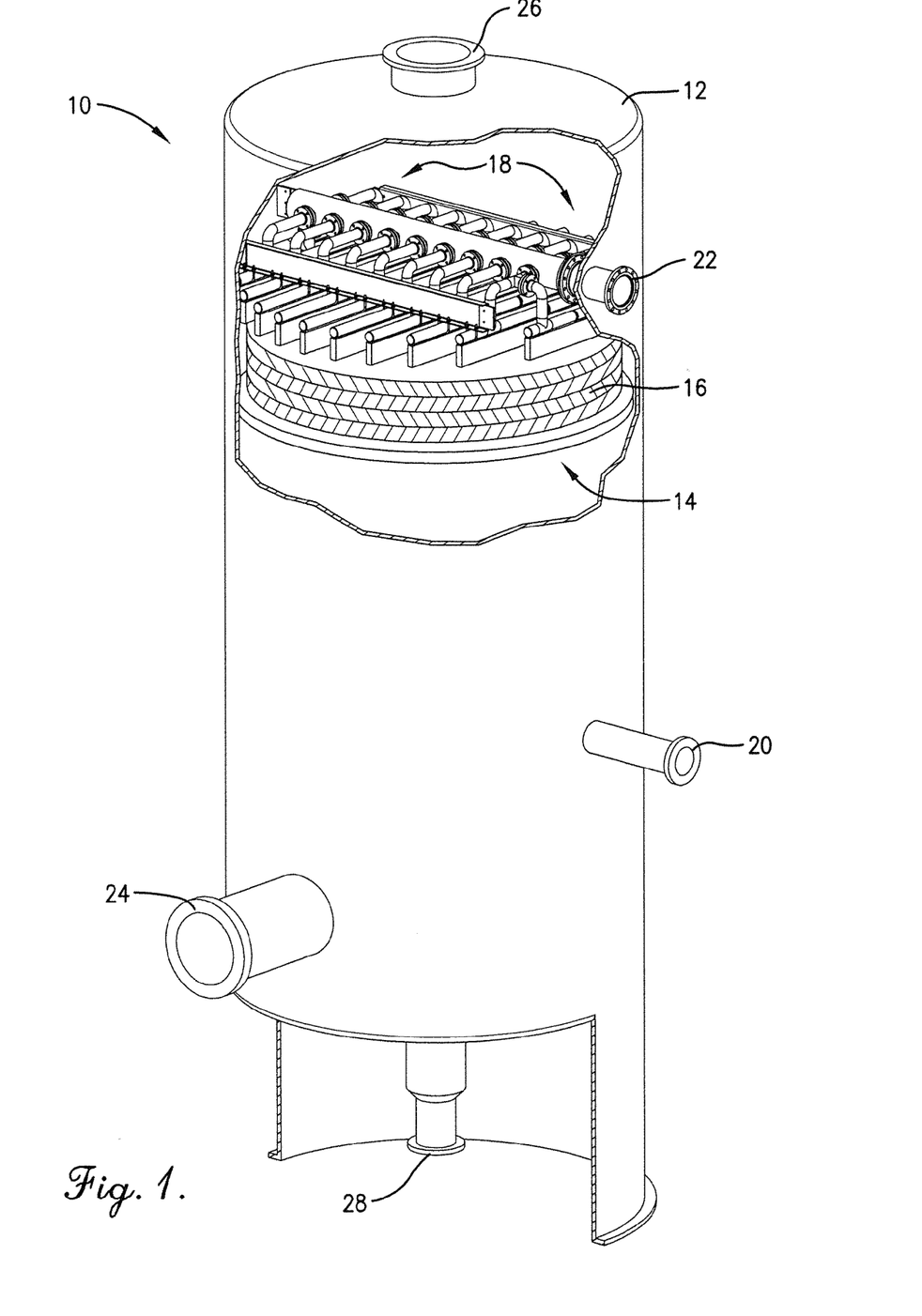
FIG. 1 is a fragmentary side perspective view of a mass transfer column with portions of the column shell broken away to illustrate one embodiment of a liquid distributor configured according to the present invention disposed therein.
Figure 2:
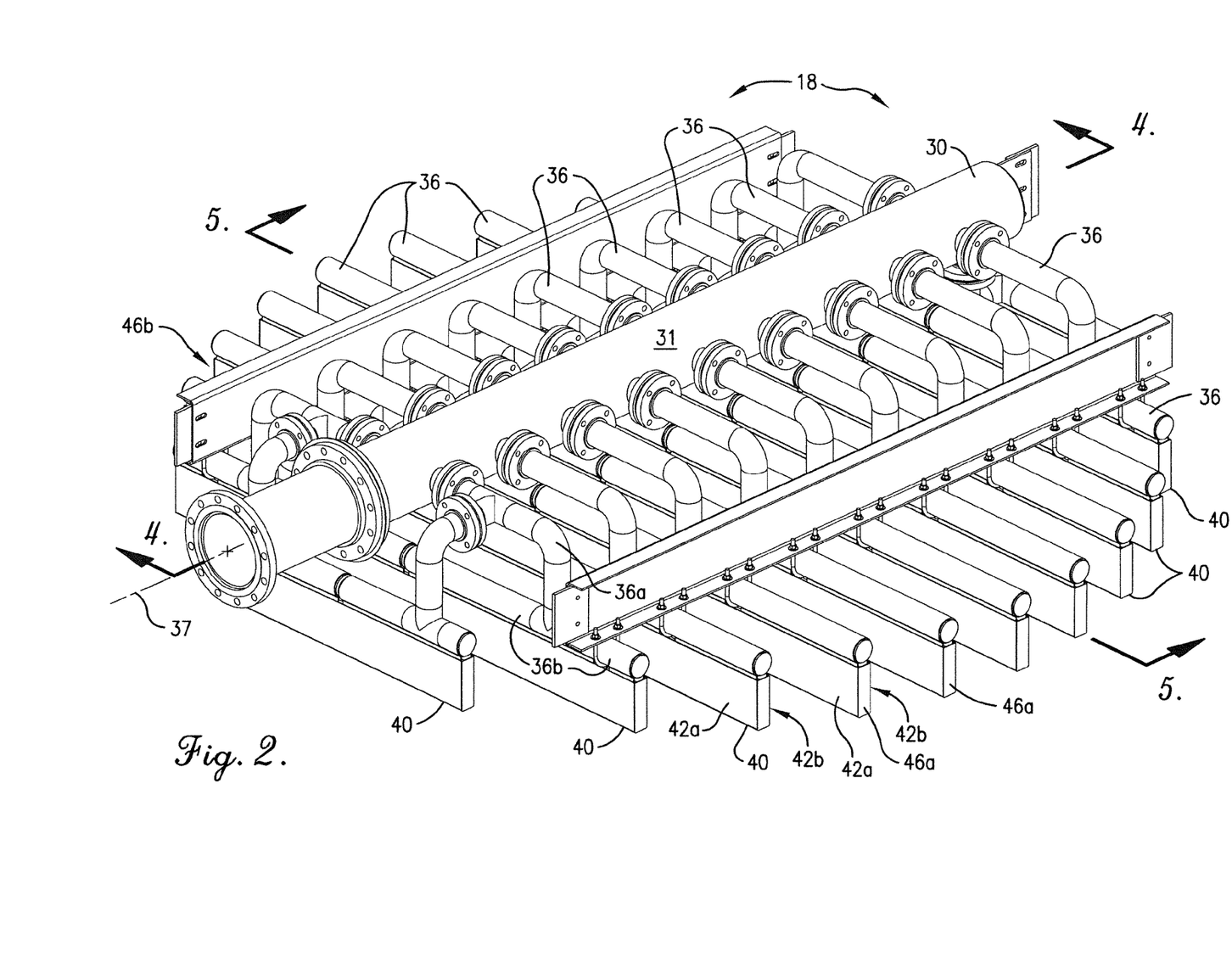
FIG. 2 is an top perspective view of the liquid distributor shown in FIG. 1.
Figure 3:
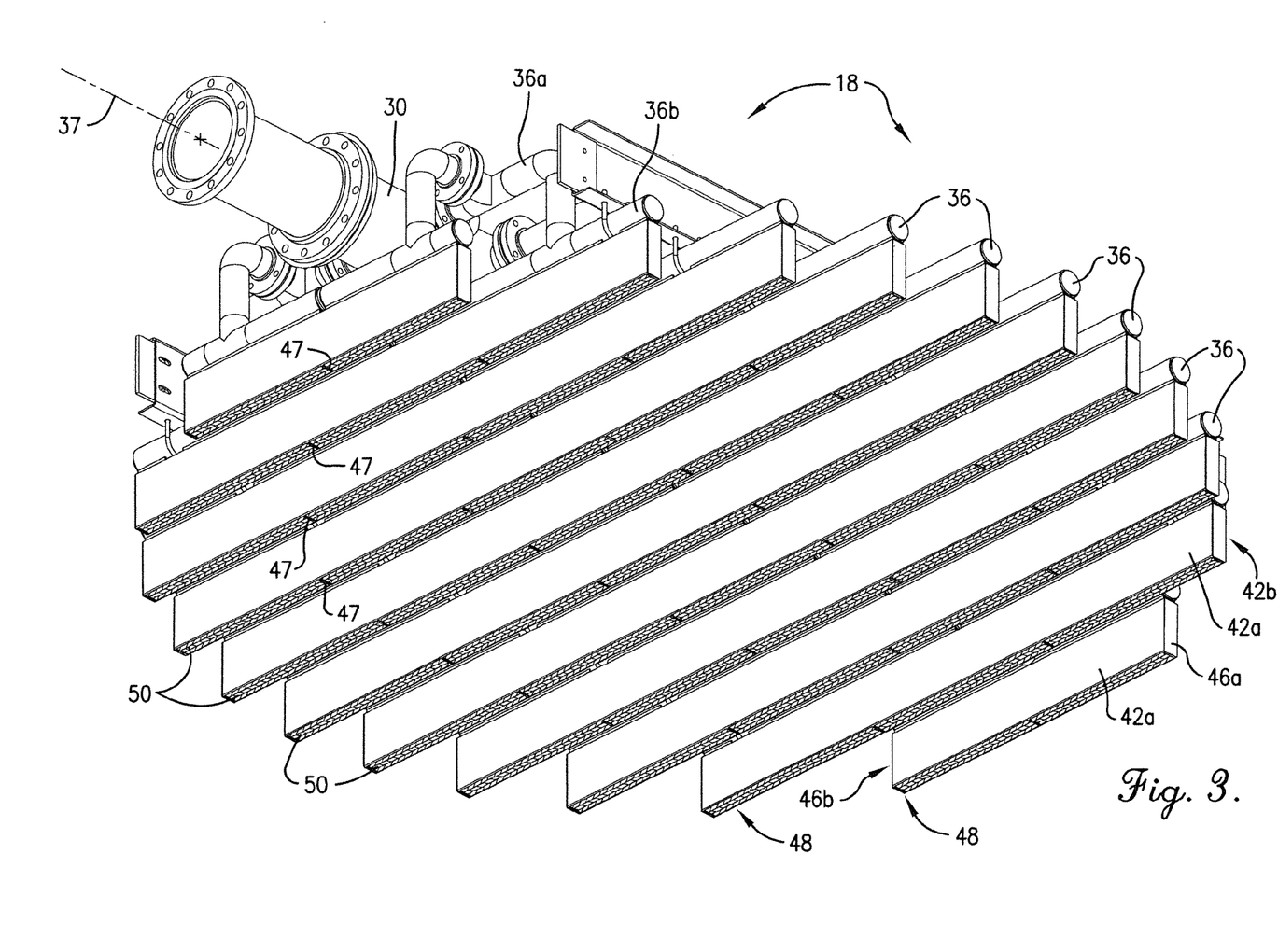
FIG. 3 is a bottom perspective view of the liquid distributor shown in FIGS. 1 and 2.
Figure 4:
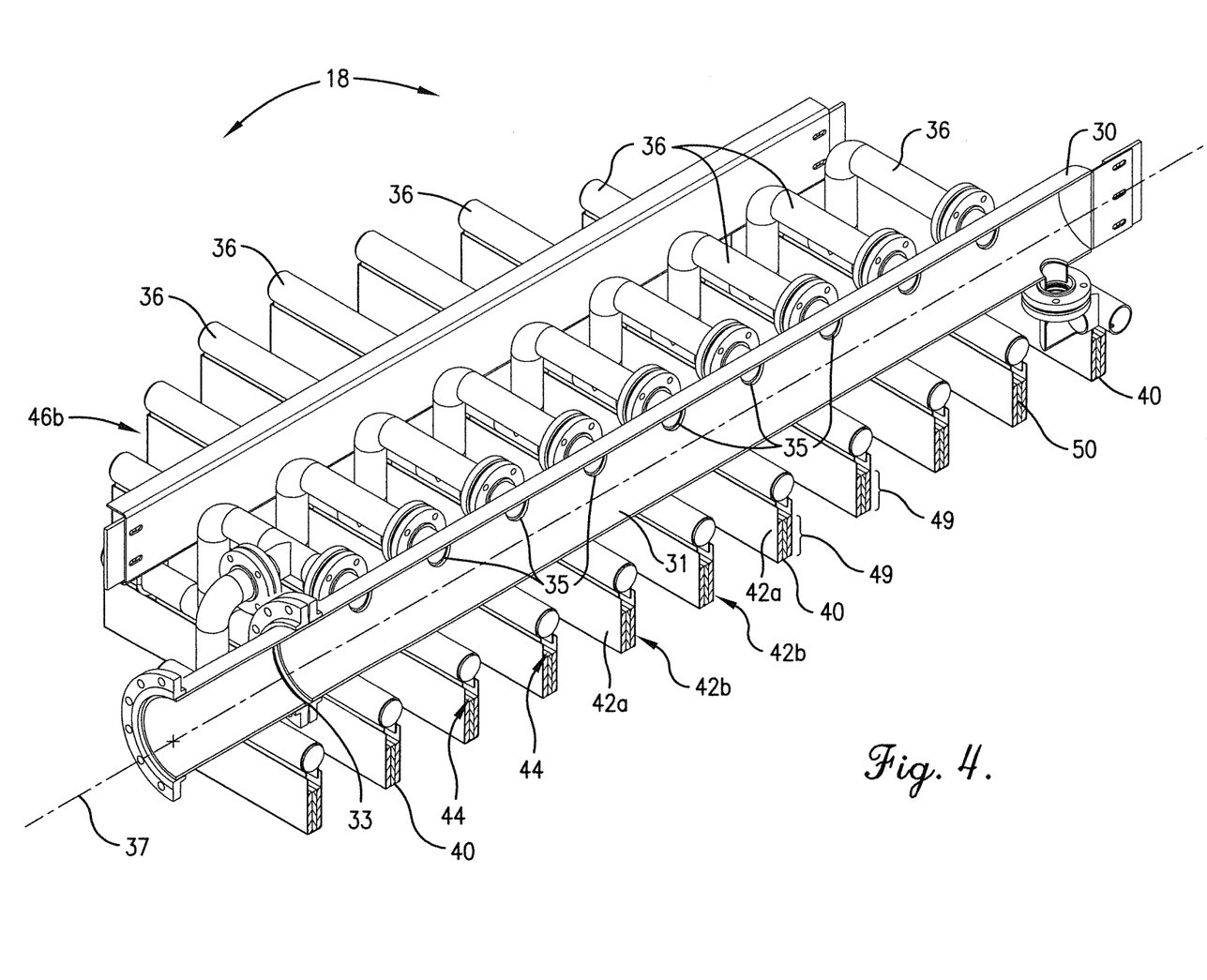
FIG. 4 is a top perspective view of the liquid distributor shown in FIGS. 1-3, taken in vertical along line 4-4 of FIG. 2 in the direction of the arrows.

Turning now to the drawings in greater detail and initially to FIG. 1, a mass transfer column is designated generally by the numeral 10 and includes an upright cylindrical shell 12 that defines an open interior region 14 in which two or more fluid streams flow in countercurrent or co-current relationship. At least a portion of the contact between the fluid streams in the column 10 is carried out in one or more mass transfer beds 16, which are disposed in interior region 14 at various locations along the height of column 10. Mass transfer bed 16 may include any type of packing material, including structured packing, random packing, and combinations thereof. The mass transfer column 10 also includes at least one liquid distributor 18, which is disposed above mass transfer bed 16 and is used to facilitate a more uniform horizontal distribution of one or more descending liquid streams within the column 10.

The mass transfer column 10 may be any suitable type of process column configured to contact two fluid streams in order to obtain fractionation products and/or to otherwise cause mass transfer and/or heat transfer between the different phases. For example, the mass transfer column 10 can be one in which crude atmospheric fractionating, lube vacuum oil fractionating, crude vacuum oil fractionating, fluid or thermal cracking fractionating, coker or visbreaker fractionating, deasphalting, coker off-gas scrubbing, reactor off-gas scrubbing, gas quenching, edible oil deodorization, pollution control scrubbing, and other processes occur. The mass transfer column 10 can be a vapor-liquid column configured to contact one or more ascending vapor streams with a descending liquid stream, a gas-liquid column configured to contact one or more ascending gas streams with a descending liquid stream, or a liquid-liquid column configured to facilitate mutual contact between ascending and descending liquid streams of varying density. Although generally depicted in FIG. 1 as comprising a cylindrical, vertically-elongated shell, other shapes, including polygonal, may be used for the mass transfer column 10. The mass transfer column 10 is of any suitable diameter and height and is constructed from one or more rigid materials that are desirably inert to, or are otherwise compatible with, the fluids and conditions present during operation of mass transfer column 10.

As shown in FIG. 1, the mass transfer column 10 can include fluid inlets 20 and 22 for introducing fluid streams into the interior region 14 of the mass transfer column 10. The fluid streams introduced into inlets 20 and 22 of mass transfer column 10 can comprise predominantly liquid streams, predominantly vapor streams, or combined vapor or liquid streams. Typically, the stream introduced into fluid inlet 22 is a liquid stream, while the fluid stream entering the mass transfer column 10 via fluid inlet 20 can be a vapor stream, a liquid stream, or a combined vapor and liquid stream. Mass transfer column 10 may also include a vapor inlet 24 for introducing a predominantly vapor stream into the lower portion of the mass transfer column 10. Although shown in FIG. 1 as including only two fluid inlets 20 and 22 and a single vapor inlet 24, it should be understood that the mass transfer column 10 may include any suitable number of fluid or vapor inlets, positioned appropriately along the height of the mass transfer column 10, as needed or desired for a particular application.

Mass transfer column 10 further includes an overhead vapor outlet 26 for discharging a vapor product from the upper portion of the mass transfer column 10 and a lower liquid outlet 28, from which a liquid product stream may be withdrawn. Other conventional column components, such as reflux stream lines, reboilers, condensers, vapor horns, and the like may also be present in the mass transfer column 10, but are not illustrated here because such items are both conventional and not believed to be necessary for an understanding of the present invention.

Turning additionally to FIGS. 2-5, a liquid distributor 18 configured according to one embodiment of the present invention will now be described. The liquid distributor 18 is a pipe or ladder-type distributor comprising at least one central distribution member 30 extending horizontally along the diameter or a chord of the mass transfer column 10, or at least a portion thereof. The central distribution member 30, in one embodiment depicted in FIGS. 2-5, may comprise an elongated piping member having a substantially cylindrical side wall 31. Central distribution members 30 having other cross-sectional shapes, including polygonal, are also contemplated. Further, although illustrated in FIGS. 2-5 as including only one central distribution member 30, liquid distributors 18 that include two or more central distribution members 30 are also well within the scope of the present invention.

The central distribution member 30 includes at least one liquid inlet 37 for receiving a stream of liquid therein. As the liquid passes through the central distribution member 30, it is divided into a plurality of smaller liquid portions, which are then discharged from the central distribution member 30 via one or more liquid outlets 35. As particularly shown in FIG. 4, the liquid outlets 35 can be of any desired shape, such as circular, triangular, or even vertically elongated, and are spaced from one another at a predetermined distance along the length of the central distribution member 30. The exact number and size of the outlets 35 is not particularly limited and may be selected to accommodate the anticipated flow rate of liquid through the liquid distributor 18.

The individual liquid streams discharged from the central distribution member 30 via the outlets 35 are fed into a plurality of elongated side members 36, which are longitudinally spaced along the length of the central distribution member 30 and extend outwardly in a generally angular direction therefrom. The elongated side members 36 are typically substantially parallel to one another and form an angle with respect to the central axis of elongation 37 of central distribution member 30 that is in the range of from about 30° to about 150°, about 45° to about 135°, or about 60° to about 120°. Preferably, but not necessarily, each of the elongated side members 36 may extend substantially perpendicularly to the axis of elongation 37 of the central distribution member 30, as shown in FIGS. 2-5. As used herein, the term "substantially" means within 5°, so that an element that is "substantially perpendicularly" is within 5° of being perpendicular. Any number of elongated side members 36 may be selected in order to achieve a desired drip-point density into the underlying mass transfer bed.

The central distribution member 30 may be configured in an overlying relationship to the elongated side members 36, as shown in FIGS. 2-5, or, in the alternative, the central distribution member 30 and the elongated side member 36 may be configured in a co-planar arrangement, wherein the central distribution member 30 and the elongated side member 36 are positioned at substantially the same vertical elevation. When each of the elongated side members 36 includes separate upper and lower portions 36a and 36b, as shown in FIGS. 2-5, one of the portions 36a (or 36b, embodiment not shown) may be configured in a co-planar relationship with the central distribution member 30, while the other portion 36b (or 36a, embodiment not shown) may be positioned at a lower vertical elevation than the central distribution member 30. Additionally, both portions 36a and 36b may reside at substantially the same vertical elevation as central distribution member 30.

Figure 5:
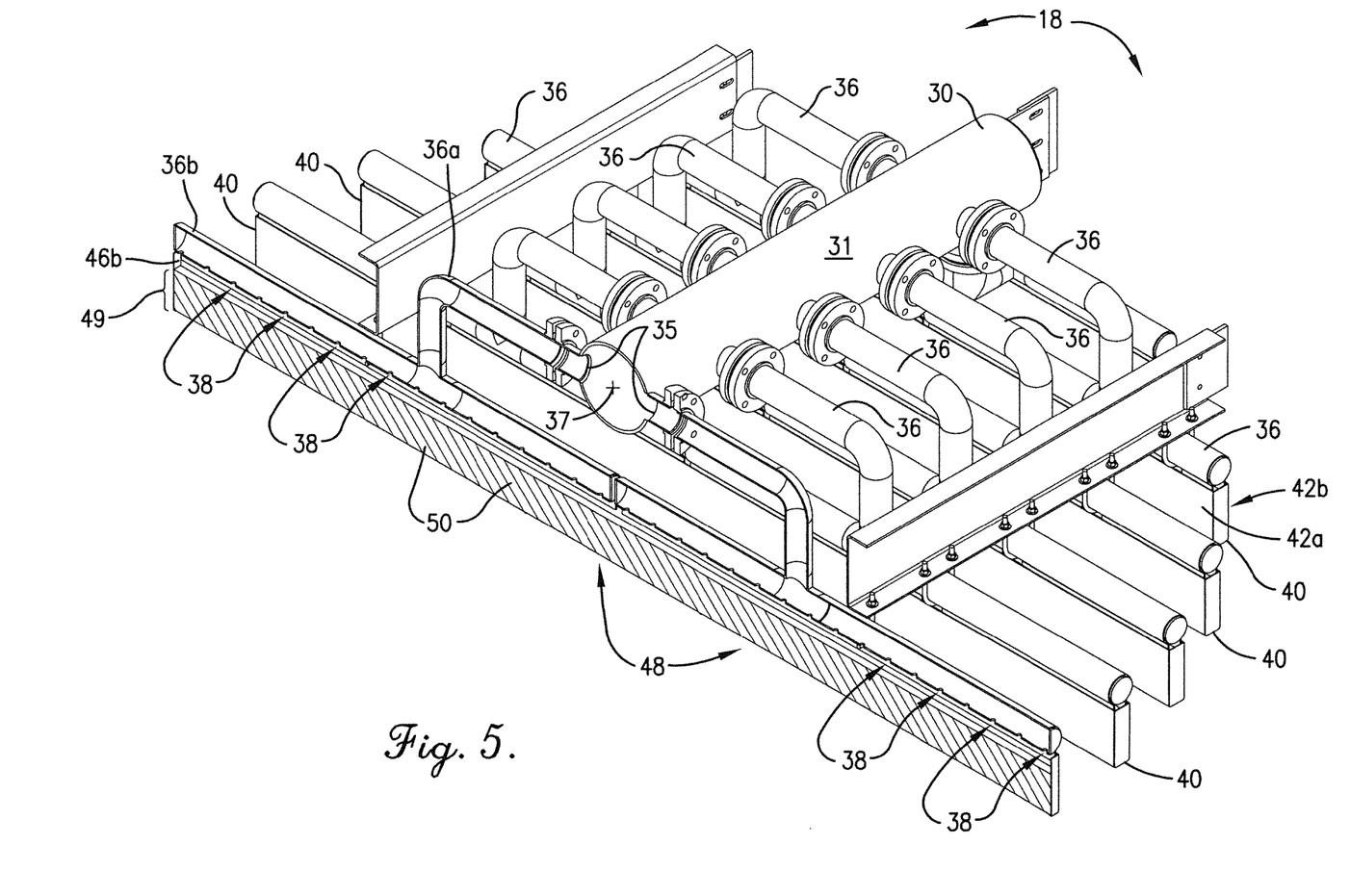
FIG. 5 is a top perspective view of the liquid distributor shown in FIGS. 1-4, taken in vertical section along line 5-5 in FIG. 2 in the direction of the arrows.

As particularly shown in FIG. 5, each of the elongated side members 36 includes a plurality of openings 38 for discharging liquid from the elongated side member 36 and into one or more distribution troughs 40, which are located proximate to, but at a lower vertical elevation than, the elongated side members 36. Openings 38 are disposed along the bottom of the elongated side member 36, but, in addition or in the alternative, one or more openings 38 could also be located in the lower portion of the side wall of at least one of the elongated side members 36. In the embodiment depicted in FIGS. 2-5, the distribution troughs 40 are arranged in a parallel orientation with respect to the elongated side members 36, but are oriented substantially perpendicularly to the central distribution member 30. Additionally, in the embodiment depicted in FIGS. 2-5, the ratio of the elongated side members 36 to the distribution troughs 40 is 1:1, such that each elongated side member 36 is configured to feed a single one of the distribution troughs 40.

Each distribution trough 40 comprises a pair of elongated side walls 42a and 42b, laterally spaced from one another and defining a liquid receiving space 44 therebetween. The liquid receiving space 44 is configured to receive at least a portion of the liquid discharged from the openings 38 of the elongated side members 36. The distribution troughs 40 also include a pair of opposing end walls 46a and 46b and a substantially open floor region 48 that extends between side walls 42a and 42b. As shown particularly in FIG. 3, each of the distribution troughs 40 may include one or more lateral support elements 47 spaced along the length of the trough 40, with the remainder of floor region 48 being open and configured to discharge liquid exiting each of the distribution troughs 40. The number and spacing of the lateral support elements 47 depends, in part, on the material of construction of and the service for which the liquid distributor 18 is intended, but may also be dictated by the type and size of the packing material disposed within liquid receiving space 44 of distribution troughs 40.

In accordance with the present invention, at least a portion, or each, of the distribution troughs 40 comprise a bed 49 of packing material 50 disposed within the liquid receiving space 44. As the liquid is introduced into liquid receiving space 44, it passes downwardly through the packing 50 before exiting distribution trough 40 via floor region 48. All of the liquid fed into the distribution troughs 40, or at least a substantial portion thereof, passes through the bed 49 of packing material 50 before being discharged from the liquid distributor 18 and onto the upper surface of an underlying mass transfer bed 16 (FIG. 1). Functionally, the bed 49 of packing material 50 enhances the horizontal spreading of the liquid as it flows downwardly through each of the distribution troughs 40.

The packing material 50 used in the distribution troughs 40 can be any suitable type of packing, including structured packing, random packing, and combinations thereof. When the packing material 50 includes structured packing, as generally illustrated in FIGS. 2-5, the bed 49 can include two or more (or at least three) sheets of vertically-extending corrugated or gauze packing. The inclination angle and crimp size of the structured packing material 50 may vary, depending on the liquid rate and desired degree of spreading. The packing material may be textured or non-textured and may or may not also be perforated. Preferably, at least a portion of the lower edge of the packing material 50 in bed 49 is serrated to create a serrated drip edge and prevent liquid collection at the lower portion of liquid distributor 18. The vertical orientation of the sheets of packing material 50 within bed 49 create "lines" of discharged liquid across the surface of the underlying mass transfer bed. These parallel drip regions spaced across the upper surface of the underlying mass transfer bed increase the uniform distribution of the liquid from distributor 18.

Figure 6:
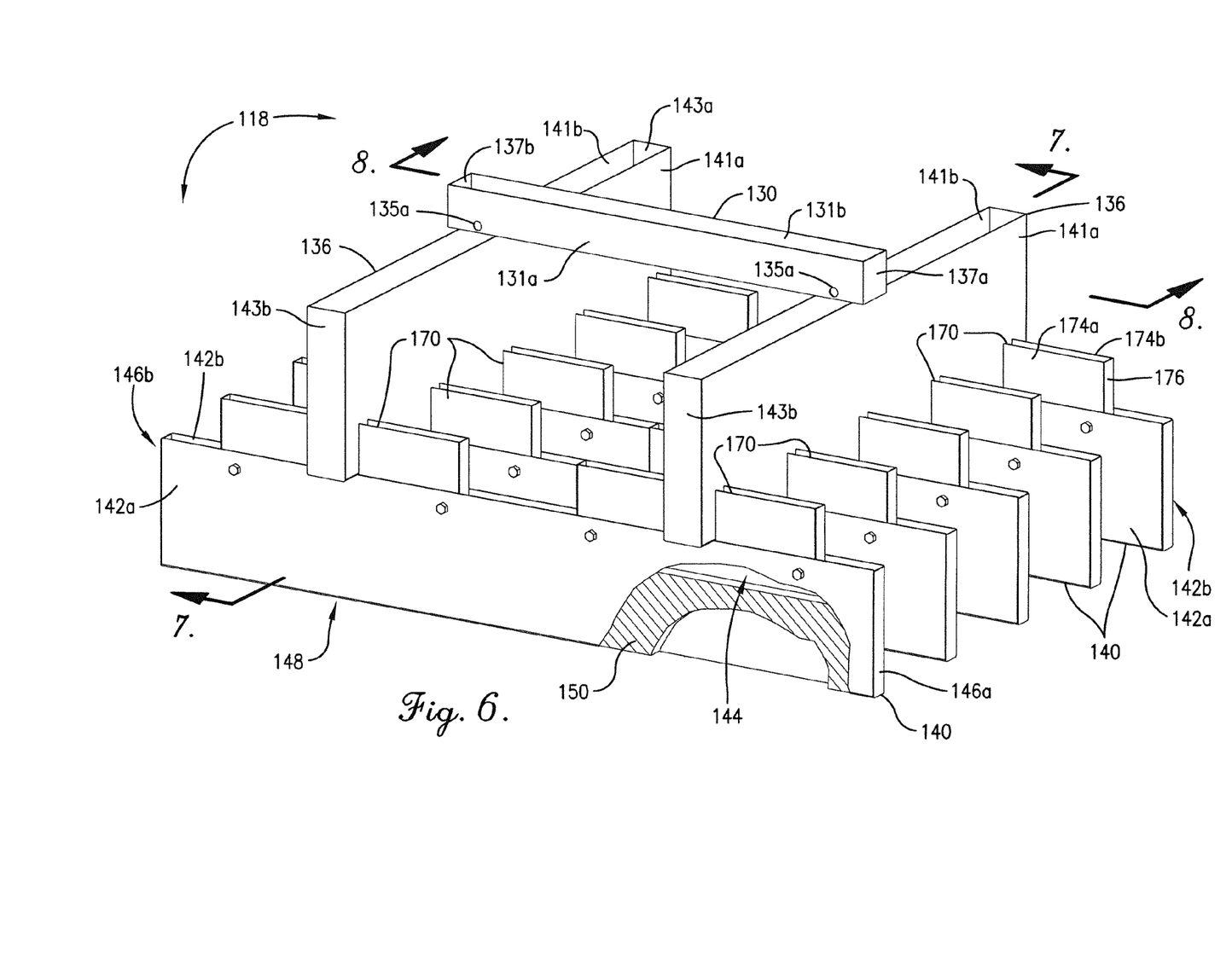
FIG. 6 is a top perspective view of a liquid distributor configured according to another embodiment of the present invention, with portions broken away to illustrate the packing material disposed within the distribution troughs of the liquid distributor.
Figure 7:
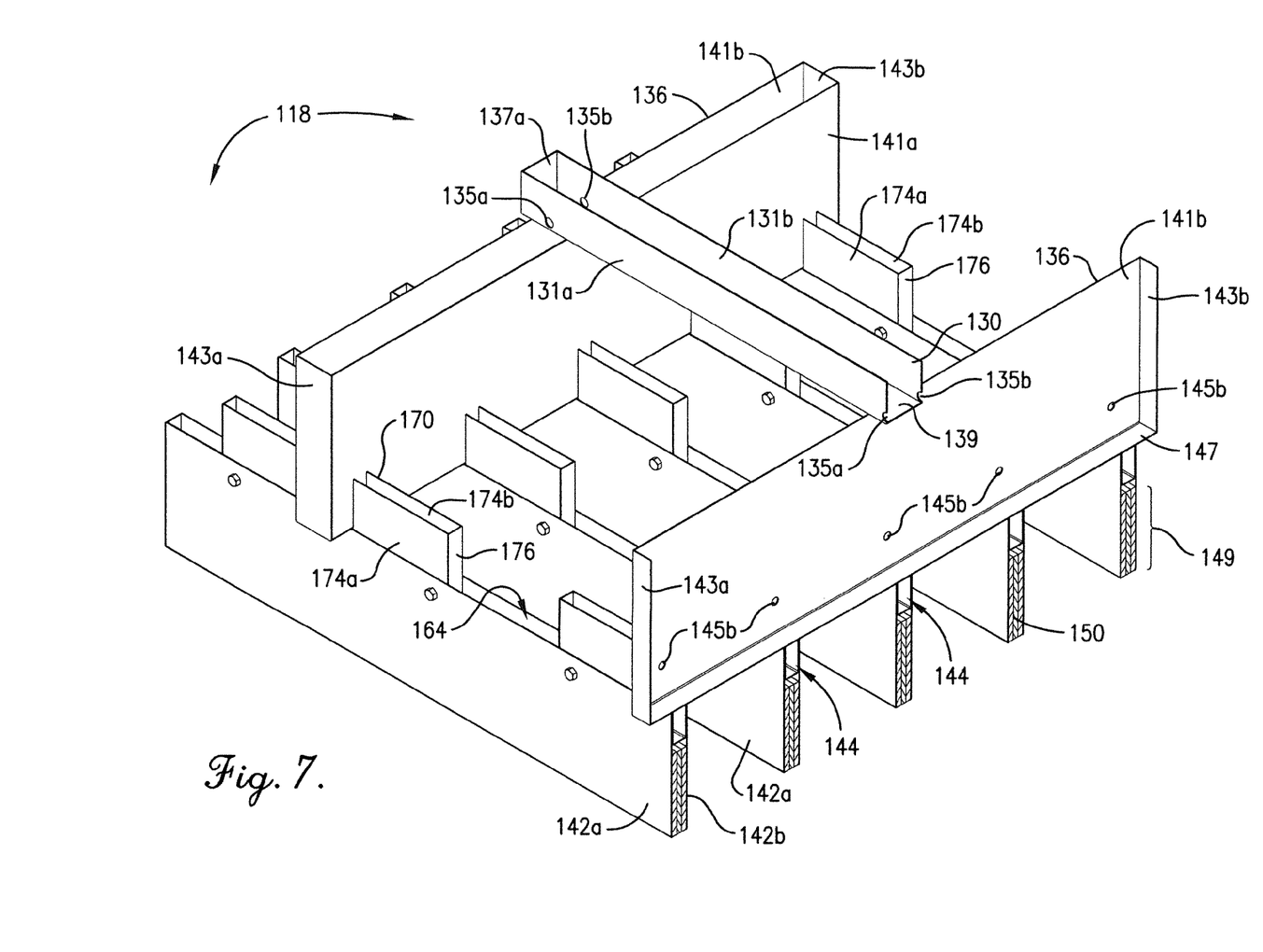
FIG. 7 is a top perspective view of the liquid distributor shown in FIG. 6, taken in vertical section along line 7-7 in FIG. 6 in the direction of the arrows.
Figure 8:
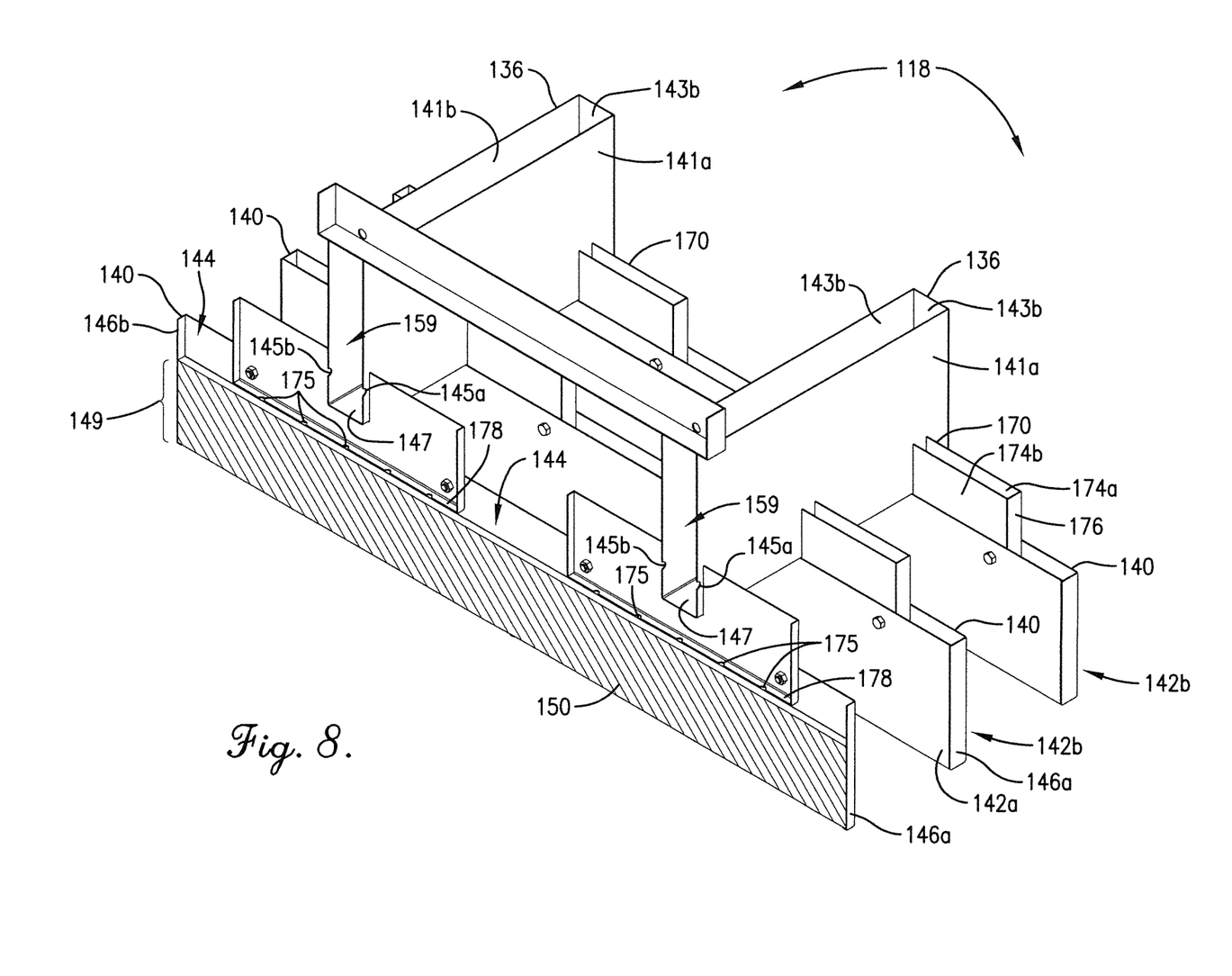
FIG. 8 is a top perspective view of the liquid distributor shown in FIGS. 6 and 7, taken in vertical section along line 8-8 of FIG. 6 in the direction of the arrows.

Turning now to FIGS. 6-8, a liquid distributor 118 configured according to another embodiment of the present invention is illustrated. As shown in FIGS. 6-8, the liquid distributor 118 includes a trough-like central distribution member 130 that includes a pair of laterally spaced elongated sidewalls 131a and 131b that extend in a substantially horizontal direction. Sidewalls 131a and 131b are connected at the bottom by a floor 139 and at the ends by end walls 137a and 137b. Optionally, a cover (not shown) may cover substantially all, or at least a portion of, the open region along the top of the central distribution member 130, depending on the specific application in which the liquid distributor 118 will be used. Although shown as including only a single distribution member 130, embodiments having two or more central distribution members 130 or more are contemplated by and fall within the scope of the present invention.

The central distribution member 130 includes a liquid inlet (not shown) for receiving a stream of liquid and a plurality of liquid outlets 135a and 135b defined within the side walls 131a and 131b of the central distribution member 130 for discharging liquid therefrom. In the alternative, one or more of outlets 135a and 135b could be defined along the length of floor 139 of central distribution member 130. Similarly to the liquid distributor 18, described in detail previously, the liquid distributor 118 further comprises a plurality of elongated side members 136 extending in an outward direction from the central distribution member 130. Preferably, the elongated side members 136 are oriented perpendicularly to the central distribution member 130, as shown in FIGS. 6-8. Rather than piping members, the elongated side members 136 of the liquid distributor 118 comprise elongated troughs that each includes a pair of laterally spaced elongated side walls 141a and 141b connected to each other at the bottom via a floor 147 and at the ends by a pair of end walls 143a and 143b. Although shown in FIGS. 6-8 as having two, generally rectangular elongated side members 136, the liquid distributor 118 may include any suitable number of elongated side members 136 having any cross-sectional shape, including half-cylindrical or polygonal.

In a similar manner as previously described, the central distribution member 130 may be arranged in an overlying position relative to the elongated side members 136, as shown in FIGS. 6-8, or, in the alternative, may be configured in a co-planar position such that the central distribution member 130 and the elongated side members 136 lie in substantially the same horizontal plane. As particularly shown in FIG. 7, each of the elongated side members 136 includes a plurality of openings 145a and 145b defined in the respective side walls 141a and 141b configured to discharge liquid from each of the elongated side members 136 into one or more of the underlying distribution troughs 140.

The liquid distributor 118 shown in FIGS. 6-8 is arranged in a perpendicular configuration, such that the distribution troughs 140 extend in a substantially perpendicularly direction with respect to the direction of extension of the elongated side members 136. Consequently, each of the elongated side members 136 is configured to feed at least two different distribution troughs 140 via longitudinally spaced discharge openings 145a and 145b positioned along the lengths of the opposing side wall 141a and 141b of each elongated side member 136. As shown in FIGS. 6-8, openings 145a and 145b are arranged in laterally-spaced pairs 159, with one opening 145a of the pair 159 being defined by one side wall 141a and the other opening 145b of the pair 159 being defined by the opposing side wall 141b. The openings 145a and 145b of each pair 159 may be spaced directly across from one another, or one of openings 145a and 145b may be offset, horizontally and/or vertically, from the other 145b or 145a (embodiment not shown). Although shown as being defined within the lower portion of the side walls 141a,b, one or more of the openings 145a or 145b could also be defined at a different position within the side walls 141a and 141b or within the floor 147 of the elongated side member 136.

When configured in a perpendicular arrangement, as shown in FIGS. 6-8, each opening 145a and 145b of pairs 159 can be configured to feed the same distribution trough 140. The number of pairs 159 of openings 145a and 145b generally corresponds to the number of distribution troughs 140 configured to be fed per elongated side member 136. Additionally, more than one elongated side members 136 may also be configured to feed the same distribution trough 146, as generally shown in FIGS. 6-8. Suitably, at least two, at least three, or at least four elongated side members 136 may be configured to feed a single one of the distribution troughs 146, depending on the size and specific column operation.

Liquid distributor 118 may also include a plurality of side arm distributors 170 for facilitating the flow of liquid between the elongated side members 136 and the distribution troughs 140. As shown in FIGS. 6-8, the side arm distributors 170 include a pair of spaced apart side walls 174a and 174b and a single end wall 176 disposed on the outer end of side arm distributor 170. Sidewalls 141a and 141b of the elongated side members 136 connect side walls 174a and 174b of the side arm distributors 170 at the other end. Typically, as illustrated in FIG. 8, side arm distributors 170 are open at the top and include a floor 178 for allowing liquid to flow from elongated side member 136 into each of the distribution troughs 140. As shown in FIG. 8, each of the floors 178 of the side arm distributors 170 comprise a plurality of holes 175 for discharging liquid into distribution troughs 140. Each of the side arm distributors 170 function to spread the liquid exiting the side arm distributor 170 across the distribution troughs 140 in a direction substantially perpendicular to the direction of extension of each of the distribution troughs 140. The holes 175 defined in the floor 178 (or, alternatively, in a lower portion of the sidewalls 174a,b) are spaced apart by a predetermined distance in order to provide liquid to the distribution troughs 140 at a desired amounts and at desired locations within the trough 140.

As shown in FIGS. 6-8, each of the distribution troughs 140 includes a pair of elongated side walls 142a and 142b laterally spaced from one another to define a liquid receiving space 144 therebetween. Distribution troughs 140 also include a pair of end walls 146a and 146b disposed at generally opposite ends of liquid receiving space 144. The top portion of distribution troughs 140 is open and the floor region 147 may also be substantially open, excepting a few lateral supports (not shown) extending between sidewalls 142a and 142b at a pre-determined distance along the length of the trough for maintaining the shape of distribution troughs 140 and/or supporting the packing material therein.

As shown in FIGS. 6-8, liquid distributor 118 also includes a bed 149 of packing material 150 disposed within liquid receiving space 144. The bed 149 is configured such that liquid fed into the distribution trough 140 passes through at least a portion of the packing material 150 prior to exiting the substantially open floor region 147 of the distribution troughs 140. As described above, the packing material 150 can be structured or random packing and can include wire mesh or gauze-type packing, as generally depicted in FIGS. 6-8. Alternatively, any other type of packing or packing arrangement previously described could also be employed in the distribution troughs 140. Similarly to the liquid distributor 18, the distribution troughs 140 of the distributor 118 are the only component of the liquid distributor 118 that includes packing material 150. Both the central distribution member 130 and the elongated side members 136 define a substantially hollow liquid receiving space that does not include any sort of packing material disposed therein.

Figure 9:
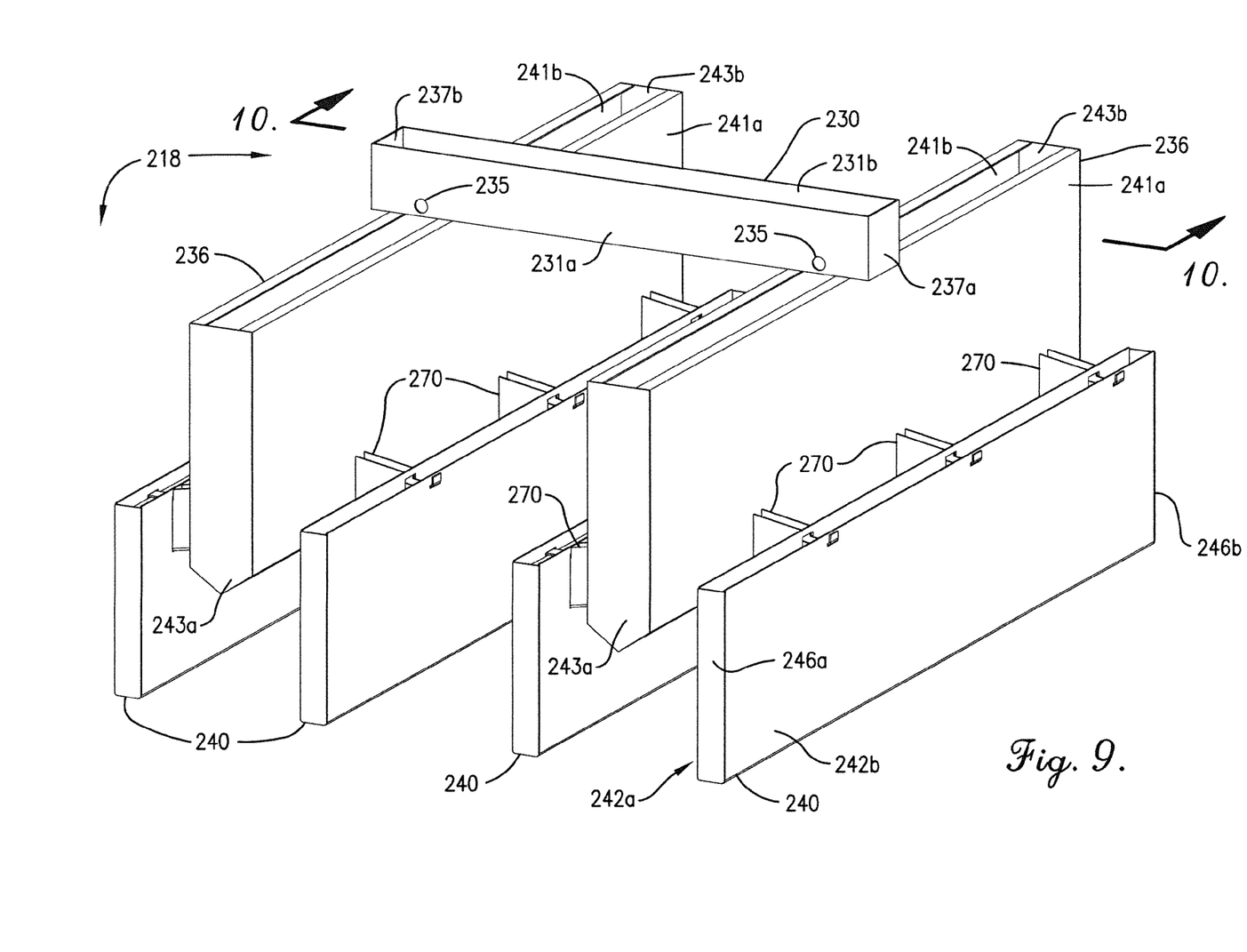
FIG. 9 is a top perspective view of a liquid distributor configured according to yet another embodiment of the present invention.
Figure 10:
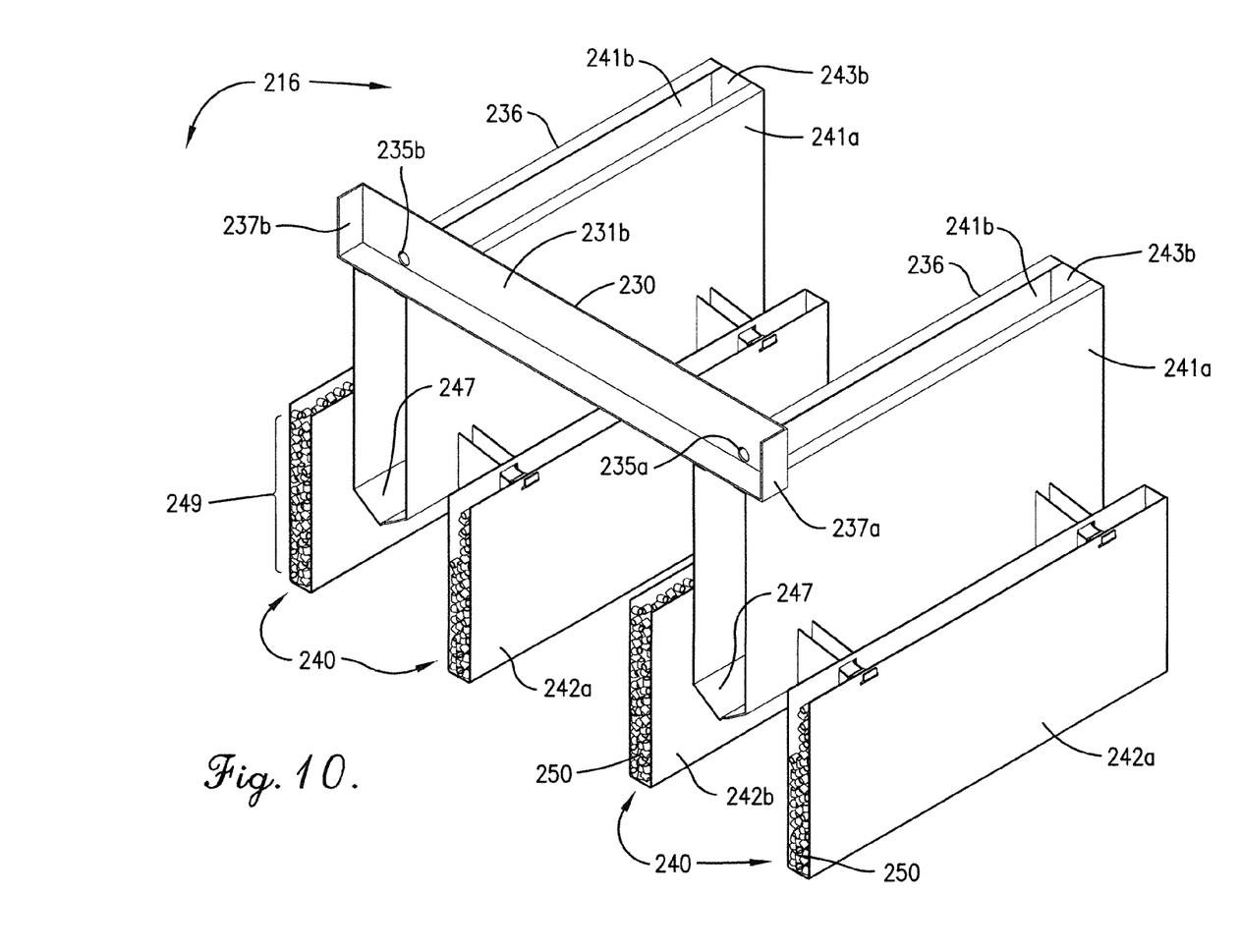
FIG. 10 is a top perspective view of the liquid distributor shown in FIG. 9, taken in vertical section along line 10-10 in FIG. 9 in the direction of the arrows.
Figure 11:
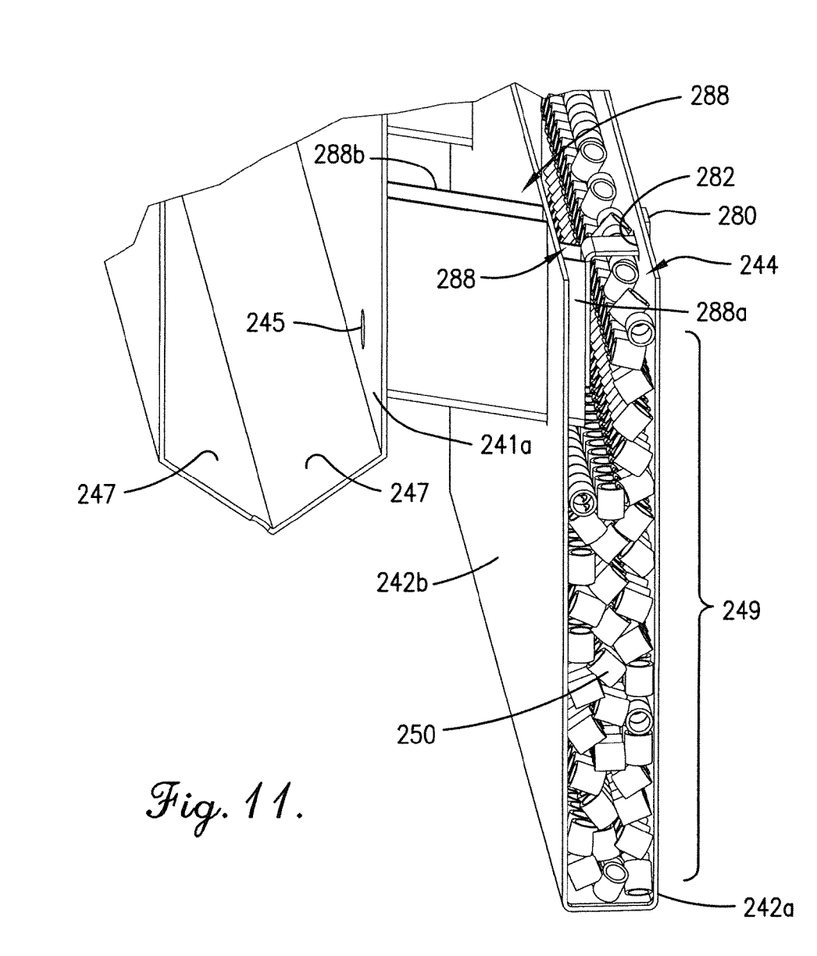
FIG. 11 is an enlarged, fragmentary view of one of the distribution troughs of the liquid distributor illustrated in FIGS. 9 and 10, particularly showing the configuration of the side arm distributor and bed of packing material within the distribution trough.

Turning now to FIGS. 9 through 11, a variation of the liquid distributor 118, designated as liquid distributor 218, is illustrated as comprising a central distribution member 230 and a plurality of elongated side members 236 disposed proximate to, but at a higher vertical elevation, than elongated distribution troughs 240. As described with respect to the embodiment shown previously in FIGS. 6-8, the central distribution member 230 includes an open-ended trough having a pair of side walls 231a and 211b, a pair of opposing end walls 237a and 237b, and a plurality of liquid outlets 235 for feeding liquid received into central distribution member 230 into each of elongated side members 236. The central distribution member 230 may be positioned at a higher vertical elevation than each of elongated side members 236, as generally shown in FIGS. 9 and 10, but embodiments wherein central distribution member 230 and elongated side members 236 are configured in a co-planar arrangement is also contemplated and within the scope of the present invention.

The liquid distributor 218 depicted in FIGS. 9-11 is configured in a parallel arrangement such that the distribution troughs 240 extend in a substantially parallel direction with respect to the direction of extension of the elongated side members 236. Each of the elongated side members 236 is configured to feed two or more different ones of the distribution troughs 240, but each of the distribution troughs 240 is fed from a single one of the elongated side members 236. When configured in the parallel arrangement as shown in FIGS. 9 and 10, however, the discharge openings disposed in a given one of the sidewalls 241a or 241b may be configured to feed liquid into a single one of the distribution troughs 240, as shown in FIGS. 9 and 10. Thus, in this arrangement, each of the distribution troughs 240 is configured to receive liquid from a single one of the elongated side members 236.

Liquid flow between the elongated side members 236 and the distribution troughs 240 can also be facilitated with a plurality of side arm distributors 270 positioned proximate to each of discharge openings 245. The side arm distributors 270 suitable for use in this embodiment are particularly illustrated in the close-up view provided in FIG. 11 and comprise an open-topped elongated member 288, having opposing side walls 286a and 286b, that extends through sidewall 242b of the distribution trough 240 and into the liquid receiving space 244. A portion of the elongated member 288a may be positioned at a lower vertical elevation than the other portion 288b of the elongated member 288b, giving the side arm distributor 270 a generally stair-stepped profile. As the liquid passes from the discharge opening 245 of the elongated side member 236, it enters an elongated member 288 and passes through the sidewall 242b into the liquid receiving space 244 of the distribution trough 240. Thereafter, the liquid descends through the bed 249 of packing material 250 before being discharged out of distribution member 240 via floor region 248 (not shown). The distribution troughs 240 may be physically connected to elongated side members 236 by side arm distributors 270 via a side arm tab 280 that extends horizontally from the upper edge of the elongated member 288 and is configured for insertion into a corresponding slot within the sidewall 242a of the distribution trough 240. This attachment feature is exemplary and other devices or structures can be utilized within the scope of the present invention.

As shown in FIGS. 9-11, the liquid distributor 218 is illustrated as utilizing random packing elements in its bed 249 of packing material 250. Additionally, or in the alternative, structured or wire mesh packing may also be used, and the details regarding packing material 250 are similar to those described previously.

Referring again to FIG. 1, as the descending liquid is discharged from the distribution troughs 40 of the liquid distributor 18, its falls onto an upper surface 17 of the mass transfer bed 16. Although illustrated as including the liquid distributor 18 as described with respect to FIGS. 2-5, it should be understood that column 10 may include the liquid distributor 118 configured as described with respect to FIGS. 6-8 or the liquid distributor 218 configured as described with respect to FIGS. 9-11. Additionally, when the column 10 includes two or more mass transfer beds 16, it may also include two or more of the liquid distributors 18, 118, 218 configured to receive and discharge a liquid stream onto the upper surface of each mass transfer bed 16 in a similar manner.

From the foregoing, it will be seen that this invention is one well adapted to obtain all of the ends and objectives hereinabove set forth with other advantages that are inherent to the structure described and disclosed.

It will be understood that certain features and sub-combinations are of utility and may be employed separately and without reference to other features and sub-combinations. This is contemplated by and is within the scope of the present claims.

Since many of the possible embodiments may be made of the invention disclosed herein without departing from the scope thereof, it is to be understood that all matter set forth herein or shown in the accompanying drawings is to be interpreted as illustrative and not in a limiting sense.

What is claimed is:

1. A flow distributor for liquid descending in a vertically elongated process column, said distributor comprising:
   a central distribution member comprising at least one inlet for receiving a liquid stream and one or more liquid outlets for discharging a portion of said liquid stream from said central distribution member;
   a plurality of elongated side members configured to receive at least a portion of the liquid discharged from said liquid outlets of said central distribution member, wherein said elongated side members are longitudinally spaced from each other along the length of said central distribution member and comprise one or more openings for discharging liquid therefrom;
   a plurality of distribution troughs positioned proximate said elongated side members, wherein each of said distribution troughs comprises a pair of elongated sidewalls laterally spaced from one another to define a liquid receiving space and a substantially open floor region therebetween, wherein said liquid receiving space is configured to receive liquid discharged from said openings of said elongated side members and discharge the liquid from said distribution trough through said floor region; and
   two or more sheets of structured packing positioned in each of said liquid receiving spaces for enhancing horizontal spreading of the liquid when it is received in the liquid receiving space and before it is discharged from the distribution trough through said floor region, each of said two or more sheets of structured packing defining a lower drip edge for said liquid.

2. The distributor of claim 1, wherein said plurality of elongated side members comprises at least a first elongated side member and a second elongated side member and said plurality of distribution troughs comprises at least a first and a second distribution trough, wherein said first elongated side member is configured to discharge liquid into each of said first and said second distribution troughs.

3. The distributor of claim 2, wherein said second elongated side member is configured to discharge liquid into each of said first and said second distribution troughs.

4. The distributor of claim 2, wherein said first elongated side member comprises a first and a second pair of liquid outlets, wherein said first pair of said liquid outlets is configured to discharge liquid into said first distribution trough and said second pair of said liquid outlets is configured to discharge liquid into said second distribution trough.

5. The distributor of claim 2, wherein said first elongated side member comprises at least a first pair of liquid outlets disposed on opposite sides of said elongated side member, wherein one outlet of said first pair is configured to discharge liquid into said first distribution trough and the other outlet of said first pair is configured to discharge liquid into said second distribution trough.

6. The distributor of claim 2, further comprising a third and a fourth distribution trough, wherein said first elongated side member is configured to discharge liquid into said first and said second distribution troughs and said second elongated side member is configured to discharge liquid into said third and said fourth distribution troughs.

7. The distributor of claim 2, further comprising a third and a fourth distribution trough, wherein each of said first and said second elongated side members are configured to discharge liquid into each of said first, second, third, and fourth distribution troughs.

8. The distributor of claim 2, wherein the axes of elongation of said first and said second elongated side members are substantially parallel to one another and said first and said second elongated side members are substantially perpendicular to the axis of elongation of said central distribution member.

9. The distributor of claim 8, wherein the axes of elongation of said first and said second distribution troughs are substantially perpendicular to the axes of elongation of said first and said second elongated side members.

10. The distributor of claim 8, wherein the axes of elongation of said first and said second distribution troughs are substantially parallel to the axes of elongation of said first and said second elongated side members.

11. The distributor of claim 1, wherein said central distribution member is positioned at a higher vertical elevation than at least a portion of said elongated side members.

12. The distributor of claim 1, wherein said central distribution member is in substantially the same vertical plane as at least a portion of said elongated side members.

13. The distributor of claim 1, wherein each of said elongated side members extends outwardly from said central distribution member at an angle in the range of from about 30° to about 150°.

14. The distributor of claim 1, wherein each of said two or more sheets of structured packing is vertically-extending and corrugated.

15. The distributor of claim 1, wherein said structured packing comprises at least two sheets of vertically-extending gauze packing.

16. The distributor of claim 1, wherein said structured packing comprises textured structured packing.

17. The distributor of claim 1, wherein said structured packing comprises perforated structured packing.

18. The distributor of claim 1, wherein at least a portion of said lower drip edge is serrated.

19. The distributor of claim 14, wherein said drip edges create parallel lines of liquid when the liquid is discharged from the distribution trough.

20. A flow distributor for liquid descending in a vertically elongated process column, said distributor comprising:
a central distribution member comprising at least one inlet for receiving a liquid stream and one or more liquid outlets for discharging a portion of said liquid stream from said central distribution member;
a plurality of elongated side members configured to receive at least a portion of the liquid discharged from said liquid outlets of said central distribution member, wherein said elongated side members are longitudinally spaced from each other along the length of said central distribution member and comprise one or more openings for discharging liquid therefrom;
a plurality of distribution troughs positioned proximate said elongated side members, wherein each of said distribution troughs comprises a pair of elongated sidewalls laterally spaced from one another to define a liquid receiving space and a substantially open floor region therebetween, wherein said liquid receiving space is configured to receive liquid discharged from said openings of said elongated side members and discharge the liquid from said distribution trough through said floor region,
wherein said plurality of elongated side members comprises at least a first elongated side member and a second elongated side member and said plurality of distribution troughs comprises at least a first and a second distribution trough, wherein said first elongated side member is configured to discharge liquid into each of said first and said second distribution troughs; and
a plurality of sheets of vertically-extending corrugated structured packing positioned in said liquid receiving space of each of said first and second distribution troughs for enhancing horizontal spreading of the liquid when it is received in the liquid receiving space and before it is discharged from the first or second distribution trough through said floor region,
wherein each of said sheets of structured packing defines a lower drip edge with said drip edges causing the liquid to be discharged from each of the first and second distribution troughs along parallel lines.

* * * * *